United States Patent
Ho et al.

(10) Patent No.: US 11,926,705 B2
(45) Date of Patent: *Mar. 12, 2024

(54) BLACK MATTE POLYIMIDE FILM

(71) Applicant: TAIMIDE TECHNOLOGY INCORPORATION, Hsinchu Hsien (TW)

(72) Inventors: Yi-Hsueh Ho, Hsinchu Hsien (TW); Meng-Ying Tsai, Hsinchu Hsien (TW)

(73) Assignee: TAIMIDE TECHNOLOGY INCORPORATION, Hsinchu Hsien (TW)

( * ) Notice: Subject to any disclaimer, the term of this patent is extended or adjusted under 35 U.S.C. 154(b) by 68 days.

This patent is subject to a terminal disclaimer.

(21) Appl. No.: 17/700,541

(22) Filed: Mar. 22, 2022

(65) Prior Publication Data
US 2022/0356306 A1 Nov. 10, 2022

(30) Foreign Application Priority Data
May 5, 2021 (TW) .................. 110116251

(51) Int. Cl.
*C08G 73/10* (2006.01)
*C08J 3/14* (2006.01)
*C08J 5/18* (2006.01)
*C08K 3/04* (2006.01)

(52) U.S. Cl.
CPC ....... *C08G 73/1042* (2013.01); *C08G 73/105* (2013.01); *C08G 73/1071* (2013.01); *C08J 3/14* (2013.01); *C08J 5/18* (2013.01); *C08K 3/04* (2013.01); *C08J 2379/08* (2013.01)

(58) Field of Classification Search
CPC ............ C08G 73/1042; C08G 73/1071; C08G 73/105; C08J 5/18; C08J 3/14
USPC ........................................................ 428/220
See application file for complete search history.

(56) References Cited

U.S. PATENT DOCUMENTS

| | | |
|---|---|---|
| 9,631,054 B2 | 4/2017 | Carney et al. |
| 10,336,045 B2 | 7/2019 | Carney et al. |
| 2015/0018484 A1* | 1/2015 | Lin .................... C08G 73/1067 264/331.12 |
| 2015/0064484 A1* | 3/2015 | Chung .................. H05K 1/053 428/458 |

* cited by examiner

*Primary Examiner* — Tahseen Khan

(57) ABSTRACT

A black matte polyimide film is provided, the black matte polyimide film includes polyimide, carbon black and polyimide fine powder. The polyimide component is obtained by polymerization of a dianhydride and a diamine, followed by chemical cyclization, in which the dianhydride is pyromellitic dianhydride, and the diamine comprises 5~15 mol % of p-phenylenediamine and 95~85 mol % of 4,4'-diaminodiphenyl ether; the carbon black is present in an amount of 2 to 8 wt % of the polyimide film; and the polyimide fine powder is present in an amount of 5 to 10 wt % of the polyimide film, such that the black matte polyimide film has a glossiness between 5 and 30 and a thermal expansion coefficient of less than 41 ppm/° C.

3 Claims, No Drawings

BLACK MATTE POLYIMIDE FILM

CROSS-REFERENCE TO RELATED APPLICATION

This non-provisional application claims priority under 35 U.S.C. § 119(a) on Patent Application No(s). 110116251 filed in Taiwan, R.O.C. on May 5, 2021, the entire contents of which are hereby incorporated by reference.

BACKGROUND OF THE INVENTION

1. Field of the Invention

The present disclosure relates to a black matte polyimide film, which is obtained by polymerization of a dianhydride and a diamine, followed by chemical cyclization. The black matte polyimide film includes 2 to 8 wt % of carbon black and 5 to 10 wt % of polyimide fine powder such that the black matte polyimide film has a glossiness between 5 and 30 and a thermal expansion coefficient of less than 41 ppm/° C.

2. Description of the Related Art

Polyimide film is often used in the cover layer of flexible circuit boards, among which black matte polyimide films are often used in special flexible board applications due to their special optical properties.

U.S. Pat. No. 9,631,054B2 proposes a black polyimide film using polyimide fine powder as the matting agent, and its base formula is composed of pyromellitic dianhydride and 4,4'-diaminodiphenyl ether. Since both polyimide fine powder and polyimide base are organic substances, the thermal expansion coefficient of the black polyimide film will be higher than that obtained by using inorganic matting powder. The higher thermal expansion coefficient causes warpage issues in downstream processes after the adhesive and copper are pasted due to the too large difference between the thermal expansion coefficients of the black polyimide film and the pasted article.

U.S. Pat. No. 10,336,045B2 proposes the use of pyromellitic dianhydride, 4,4'-diaminodiphenyl ether and p-phenylenediamine as a polyimide formulation, in which 4,4'-diaminodiphenyl ether is present in an amount of 20 to 80% of the molar number of the total diamine and p-phenylenediamine is present in an amount of 80 to 20% of the molar number of the total diamine. The base formulation can improve the problem of relatively high thermal expansion coefficient, but when the ratio of p-phenylenediamine is too high, the alkali resistance will decrease. In the subsequent flexible board processing process, there are often processes such as lye cleaning. Poor alkali resistance will cause issues such as powder drop and optical properties variation.

The present invention is a black matte polyimide film, which can have lower thermal expansion, and can have better alkali resistance.

BRIEF SUMMARY OF THE INVENTION

The black matte polyimide film of the present invention includes polyimide, carbon black and polyimide fine powder. The polyimide component is present in an amount of 75 to 93 wt % of the polyimide film. The polyimide is obtained by polymerization of a dianhydride and a diamine to form a polyimide precursor, followed by chemical cyclization of the polyimide precursor, in which the dianhydride is pyromellitic dianhydride, and the diamine comprises 5~15 mol % of p-phenylenediamine and 95~85 mol % of 4,4'-diaminodiphenyl ether; the carbon black is present in an amount of 2 to 8 wt % of the polyimide film; the polyimide fine powder has a particle size between 2 and 10 μm and is present in an amount of 5 to 10 wt % of the polyimide film; and the black matte polyimide film has a 60° glossiness between 5 and 30 and a thermal expansion coefficient of less than 41 ppm/° C.

DETAILED DESCRIPTION OF THE INVENTION

The present invention discloses a black matte polyimide film, which includes polyimide, carbon black and polyimide fine powder. The polyimide is present in an amount of 75 to 93 wt % of the polyimide film and obtained by polymerization of a dianhydride and a diamine to form a polyimide precursor, followed by chemical cyclization of the polyimide precursor, in which the dianhydride is pyromellitic dianhydride, and the diamine comprises 5~15 mol % of p-phenylenediamine and 95~85 mol % of 4,4'-diaminodiphenyl ether; the carbon black is present in an amount of 2 to 8 wt % of the polyimide film; the polyimide fine powder has a particle size between 2 and 10 μm and is present in an amount of 5 to 10 wt % of the polyimide film; and the black matte polyimide film has a 60° glossiness between 5 and 30 and a thermal expansion coefficient of less than 41 ppm/° C.

Preparation of Polyimide Precursor

The polyimide precursor is composed of a dianhydride and a diamine, wherein the dianhydride is pyromellitic dianhydride, and the diamine includes 4,4'-diaminodiphenyl ether (ODA) and p-phenylenediamine (PDA). Since the addition amount of phenylenediamine increases, the alkali resistance decreases, and when the addition amount of phenylenediamine is insufficient, the thermal expansion coefficient increases, therefore, the addition amount of p-phenylenediamine in the present invention is 5-15% of the total molar number of the diamine, and the addition amount of 4,4'-diaminodiphenyl ether is 95~85% of the total molar number of the diamine.

As to the preparation method of the polyimide precursor, phenylenediamine was mixed with the solvent, and then a small amount of pyromellitic dianhydride was added to form the first segment. The molar number of the diamine of the first segment needs to be more than that of the dianhydride. As a solvent, dimethylacetamide (DMAc), N-methylpyrrolidone (NMP), N-ethyl-2-pyrrolidone (NEP), γ-butyrolactone (GBL) and N,N-dimethylformamide (DMF) could be used for the preparation of the polyimide component. The present invention used dimethylacetamide as the solvent.

The first segment solution described above was added with 4,4'-diaminodiphenyl ether. After it was completely dissolved, pyromellitic dianhydride was added and stirred for two hours, and then a trace amount of pyromellitic dianhydride was used to adjust the viscosity. Finally, the solution was adjusted to 100,000 cps~250,000 cps. Meanwhile, the solid content of the solution may be between 15 and 25 wt %, and the preparation of the polyimide precursor was completed.

Preparation of Polyimide Fine Powder

As to the preparation of polyimide fine powder, 4,4'-diaminodiphenyl ether and dimethylacetamide were mixed in a three-necked flask, and then pyromellitic dianhydride was slowly added. The stirring was continued and heating was carried out at about 170° C. to react for about 18 hours to obtain the polyimide precipitate. The polyimide precipitate was washed with water and ethanol, filtered under vacuum, and heated and dried at about 160° C. for about 1 hour, and finally the polyimide fine powder can be obtained. The particle size analyzer (model Horiba LA-950, sold by Horiba, Instruments) was used to detect the average particle size of the obtained powder.

The molar ratio of the diamine and dianhydride monomers of the polyimide fine powder needs to be between 1:0.95 and 1:0.995, and the solid content during polymerization is controlled between 5 and 15 wt %, thereby obtaining the polyimide fine powder with a particle size of 2 to 10 μm. The effective particle size (S) of the 2-10 μm polyimide fine powder is greater than 70%, wherein the effective particle size (S) is:

$$S=B/(A+B+C)\times 100\%$$

A: percentage of polyimide fine powder with a particle size of less than 2 μm,

B: percentage of polyimide fine powder with a particle size between 2 and 10 μm, and C: percentage of polyimide fine powder with a particle size of more than Preparation of Black Matte Polyimide Film The carbon black, polyimide fine powder and dimethylacetamide were formulated into a solution with a weight ratio of 1:1.95:17.7. After uniform stirring, the solution was milled using 0.8 mm zirconium beads with a zirconium bead filling rate of 50% by volume for 30 minutes, thereby obtaining the black matte slurry.

The carbon black of the black matte slurry was insulating carbon black, and Evonik® SPECIAL BLACK 4A (SB4A) insulating carbon black was used in the present invention.

The weight ratio of carbon black, polyimide fine powder and dimethylacetamide in the black matte slurry can be adjusted as required, wherein the weight ratio of carbon black and polyimide fine powder is related to transmittance and glossiness. The amount of carbon black added in the present invention ranges from 2 to 8% of the weight of the black polyimide film, and the amount of polyimide fine powder added ranges from 5 to 10% of the weight of the black polyimide film.

The above-mentioned black matt slurry was mixed with the polyimide precursor, and after stirring, a catalyst and a dehydrating agent were added to carry out chemical cyclization. The dehydrating agent can be acetic anhydride or benzoic anhydride. In the present invention, acetic anhydride was selected for use as the dehydrating agent. The catalyst can be pyridine, 3-picoline, 2-picoline, 4-picoline, isoquinoline, quinoline, triethylamine, among which the preferred selection is pyridine, 3-picoline, 2-picoline and 4-picoline. In the present invention, 3-picoline is selected as the catalyst.

The catalyst and dehydrating agent described above may be used alone, and may also be mixed with the solvent for diluting to be added to the mixed solution. The mixed solution containing the dehydrating agent and the catalyst was deaerated by the centrifugal deaeration machine after uniform stirring. The deaerated solution was applied to the glass plate using a doctor blade with a gap of 300 μm. The coated samples were baked in an oven at 80° C. for 20 minutes, heated to 170° C. and baked for 20 minutes, and then further heated to 350° C. and baked for 20 minutes as the final treatment. After the baking was finished, the glass plate was placed in water and the film was removed to obtain the black matte polyimide film.

In addition to the glass plate, the substrate of the film-forming process described above can also use the metal plate. When using the metal plate to make the black matte polyimide film, after being baked and dried in an 80° C. oven, it needs to remove the semi-dry film from the metal plate. The removed semi-dry film was then fixed on the metal frame, heated to 170° C. and baked for 20 minutes, and finally heated to 350° C. and baked for 20 minutes to obtain the black matte polyimide film.

The black matte polyimide film described above may have a film thickness of 5 μm to 100 μm.

The black matte polyimide film described above can be used as a cover film having an adhesive layer and a base film.

EXAMPLE

<Detection Method>

The properties of the composite films obtained in the following examples were measured using the following methods.

Thermal expansion coefficient (100° C.~200° C.): According to ASTM D696 specification, the model Q400 TMA instrument available from TA Instruments company was used for measurement. The thermal expansion coefficient of the polyimide film was measured at 100° C.~200° C., and the heating rate was set to 10° C./min. In order to remove the stress caused by the heat treatment, after removing the residual stress by the first measurement, the second measurement result was used as the actual value.

Optical transmittance: According to ISO 14782 specification, the model NDH-2000N instrument produced by Nippon Denshoku Company was used for measurement.

Glossiness: The model micro-TRI-gloss gloss meter of BYK brand was used to measure the glossiness at 60 degrees.

Example 1

Preparation of Polyimide Fine Powder 14.35 grams of 4,4'-diaminodiphenyl ether, 14.86 grams of pyromellitic dianhydride, and 570 grams of dimethylacetamide were placed in a three-necked flask (the molar ratio of 4,4'-diaminodiphenyl ether and pyromellitic dianhydride monomers was 1:0.980, and the solid content was 6 wt %). The stirring was continued and heating was performed at 170° C. to react for 18 hours to obtain the polyimide precipitate. The precipitate was washed with water and ethanol, vacuum filtered, heated and dried at 160° C. for about 1 hour to obtain about 26.7 g of polyimide fine powder. The average particle size of the obtained powder was detected to be 2.4 μm using a particle size analyzer (model Horiba LA-950, sold by Horiba, Instruments Inc.). The effective particle size (S) of the polyimide fine powder was 93%.

Preparation of Polyimide Film 1.82 grams of p-phenylenediamine was added into 451 grams of dimethylacetamide and stirred and mixed. After the p-phenylenediamine was completely dissolved, 2.20 grams of pyromellitic dianhydride was added and stirred to react for 30 minutes, and then 44.76 grams of 4,4'-diaminodiphenyl ether was added. After the 4,4'-diaminodiphenyl ether was completely dissolved, 49.17 grams of pyromellitic dianhydride was slowly added, and the temperature was controlled at 25° C. After reaction with stirring for two hours, a trace amount of pyromellitic dianhydride was used to adjust the viscosity. Finally, a polyamic acid solution with a solid content of 18 wt % and a viscosity of 165,000 cps was obtained.

The Evonik® SPECIAL BLACK 4A (SB4A) insulating carbon black, polyimide powder and dimethylacetamide were formulated into a solution with a weight ratio of 1:1.95:17.7. After stirring evenly, the solution was milled using 0.8 mm zirconium beads with a zirconium bead filling rate of 50% by volume. The milling time was 30 minutes. After the milling was finished, 6 grams of the solution was taken out, and 40 grams of the polyamic acid solution was added. After stirring evenly, acetic anhydride was diluted with dimethylacetamide in a weight ratio of 2 to 1, and 3-picoline was diluted with dimethylacetamide in a weight ratio of 1 to 1 before addition of 8.9 ml of the acetic anhydride diluted solution and 5.1 ml of the 3-picoline diluted solution. The mixed solution was deaerated using the centrifugal deaeration machine after uniform stirring. The deaerated solution was applied to the glass plate using a doctor blade with a gap of 300 μm. The coated samples were baked in an oven at 80° C. for 20 minutes, heated to 170° C. with a heating rate of 1.8° C./min and baked for 20 minutes, and then further heated to 350° C. with a heating rate of 2.0° C./min and baked for 20 minutes as the final treatment.

Example 2

The preparation of polyimide fine powder was the same as Example 1.
Preparation of Polyimide Film
2.62 grams of p-phenylenediamine was added into 451 grams of dimethylacetamide and stirred and mixed. After the p-phenylenediamine was completely dissolved, 3.17 grams of pyromellitic dianhydride was added and stirred to react for 30 minutes, and then 43.61 grams of 4,4'-diaminodiphenyl ether was added. After the 4,4'-diaminodiphenyl ether was completely dissolved, 48.56 grams of pyromellitic dianhydride was slowly added, and the temperature was controlled at 25° C. After reaction with stirring for two hours, a trace amount of pyromellitic dianhydride was used to adjust the viscosity. Finally, a polyamic acid solution with a solid content of 18 wt % and a viscosity of 162,000 cps was obtained.
The Evonik® SPECIAL BLACK 4A (SB4A) insulating carbon black, polyimide powder and dimethylacetamide were formulated into a solution with a weight ratio of 1:1.95:17.7. After stirring evenly, the solution was milled using 0.8 mm zirconium beads with a zirconium bead filling rate of 50% by volume. The milling time was 30 minutes. After the milling was finished, 6 grams of the solution was taken out, and 40 grams of the polyamic acid solution was added. After stirring evenly, acetic anhydride was diluted with dimethylacetamide in a weight ratio of 2 to 1, and 3-picoline was diluted with dimethylacetamide in a weight ratio of 1 to 1 before addition of 9.1 ml of the acetic anhydride diluted solution and 5.2 ml of the 3-picoline diluted solution. The mixed solution was deaerated using the centrifugal deaeration machine after uniform stirring. The deaerated solution was applied to the glass plate using a doctor blade with a gap of 300 μm. The coated samples were baked in an oven at 80° C. for 20 minutes, heated to 170° C. with a heating rate of 1.8° C./min and baked for 20 minutes, and then further heated to 350° C. with a heating rate of 2.0° C./min and baked for 20 minutes as the final treatment.

Example 3

The preparation of polyimide fine powder was the same as Example 1.

Preparation of Polyimide Film
3.97 grams of p-phenylenediamine was added into 451 grams of dimethylacetamide and stirred and mixed. After the p-phenylenediamine was completely dissolved, 4.80 grams of pyromellitic dianhydride was added and stirred to react for 30 minutes, and then 45.57 grams of 4,4'-diaminodiphenyl ether was added. After the 4,4'-diaminodiphenyl ether was completely dissolved, 47.51 grams of pyromellitic dianhydride was slowly added, and the temperature was controlled at 25° C. After reaction with stirring for two hours, a trace amount of pyromellitic dianhydride was used to adjust the viscosity. Finally, a polyamic acid solution with a solid content of 18 wt % and a viscosity of 162,000 cps was obtained.
The Evonik® SPECIAL BLACK 4A (SB4A) insulating carbon black, polyimide powder and dimethylacetamide were formulated into a solution with a weight ratio of 1:1.95:17.7. After stirring evenly, the solution was milled using 0.8 mm zirconium beads with a zirconium bead filling rate of 50% by volume. The milling time was 30 minutes. After the milling was finished, 6 grams of the solution was taken out, and 40 grams of the polyamic acid solution was added. After stirring evenly, acetic anhydride was diluted with dimethylacetamide in a weight ratio of 2 to 1, and 3-picoline was diluted with dimethylacetamide in a weight ratio of 1 to 1 before addition of 9.2 ml of the acetic anhydride diluted solution and 5.3 ml of the 3-picoline diluted solution. The mixed solution was deaerated using the centrifugal deaeration machine after uniform stirring. The deaerated solution was applied to the glass plate using a doctor blade with a gap of 300 μm. The coated samples were baked in an oven at 80° C. for 20 minutes, heated to 170° C. with a heating rate of 1.8° C./min and baked for 20 minutes, and then further heated to 350° C. with a heating rate of 2.0° C./min and baked for 20 minutes as the final treatment.

Comparative Example 1

The preparation of polyimide fine powder was the same as Example 1.
Preparation of Polyimide Film
47.38 grams of 4,4'-diaminodiphenyl ether was added into 451 grams of dimethylacetamide and stirred and mixed. After the 4,4'-diaminodiphenyl ether was completely dissolved, 50.58 grams of pyromellitic dianhydride was slowly added, and the temperature was controlled at 25° C. After reaction with stirring for two hours, a trace amount of pyromellitic dianhydride was used to adjust the viscosity. Finally, a polyamic acid solution with a solid content of 18 wt % and a viscosity of 160,000 cps was obtained.
The Evonik® SPECIAL BLACK 4A (SB4A) insulating carbon black, polyimide powder and dimethylacetamide were formulated into a solution with a weight ratio of 1:1.95:17.7. After stirring evenly, the solution was milled using 0.8 mm zirconium beads with a zirconium bead filling rate of 50% by volume. The milling time was 30 minutes. After the milling was finished, 6 grams of the solution was taken out, and 40 grams of the polyamic acid solution was added. After stirring evenly, acetic anhydride was diluted with dimethylacetamide in a weight ratio of 2 to 1, and 3-picoline was diluted with dimethylacetamide in a weight ratio of 1 to 1 before addition of 8.9 ml of the acetic anhydride diluted solution and 5.1 ml of the 3-picoline diluted solution. The mixed solution was deaerated using the centrifugal deaeration machine after uniform stirring. The deaerated solution was applied to the glass plate using a doctor blade with a gap of 300 μm. The coated samples were baked in an oven at 80° C. for 20 minutes, heated to 170° C. with a heating rate of 1.8° C./min and baked for 20 minutes, and then further heated to 350° C. with a heating rate of 2.0° C./min and baked for 20 minutes as the final treatment.

Comparative Example 2

The preparation of polyimide fine powder was the same as Example 1.
Preparation of Polyimide Film
9.704 grams of p-phenylenediamine was added into 451 grams of dimethylacetamide and stirred and mixed. After the p-phenylenediamine was completely dissolved, 11.744 grams of pyromellitic dianhydride was added and stirred to react for 30 minutes, and then 33.371 grams of 4,4'-diaminodiphenyl ether was added. After the 4,4'-diaminodiphenyl ether was completely dissolved, 43.062 grams of pyromellitic dianhydride was slowly added, and the temperature was controlled at 25° C. After reaction with stirring for two hours, a trace amount of pyromellitic dianhydride was used to adjust the viscosity. Finally, a polyamic acid solution with a solid content of 18 wt % and a viscosity of 163,000 cps was obtained.

The Evonik® SPECIAL BLACK 4A (SB4A) insulating carbon black, polyimide powder and dimethylacetamide were formulated into a solution with a weight ratio of 1:1.95:17.7. After stirring evenly, the solution was milled using 0.8 mm zirconium beads with a zirconium bead filling rate of 50% by volume. The milling time was 30 minutes. After the milling was finished, 6 grams of the solution was taken out, and 40 grams of the polyamic acid solution was added. After stirring evenly, acetic anhydride was diluted with dimethylacetamide in a weight ratio of 2 to 1, and 3-picoline was diluted with dimethylacetamide in a weight ratio of 1 to 1 before addition of 8.9 ml of the acetic anhydride diluted solution and 5.1 ml of the 3-picoline diluted solution. The mixed solution was deaerated using the centrifugal deaeration machine after uniform stirring. The deaerated solution was applied to the glass plate using a doctor blade with a gap of 300 µm. The coated samples were baked in an oven at 80° C. for 20 minutes, heated to 170° C. with a heating rate of 1.8° C./min and baked for 20 minutes, and then further heated to 350° C. with a heating rate of 2.0° C./min and baked for 20 minutes as the final treatment.

The Examples and Comparative Examples are compared in the following table:

|  | Dianhydride mol % | Diamine mol % | | CB wt % | PIP wt % | CTE ppm/° C. | TT % |
|---|---|---|---|---|---|---|---|
| Ex. 1 | PMDA 100 | ODA 93 | PDA 7 | 3.9 | 7.6 | 39.5 | 0.25 |
| Ex. 2 | PMDA 100 | ODA 90 | PDA 10 | 3.9 | 7.6 | 38.6 | 0.22 |
| Ex. 3 | PMDA 100 | ODA 85 | PDA 15 | 3.9 | 7.6 | 34.7 | 0.21 |
| Comp. Ex. 1 | PMDA 100 | ODA 100 | | 3.9 | 7.6 | 42.1 | 0.22 |
| Comp. Ex. 2 | PMDA 100 | ODA 65 | PDA 35 | 3.9 | 7.6 | 24.6 | 0.25 |

|  | TT NaOH 10 wt %, 50° C., 10 min | Glossiness | Glossiness NaOH 10 wt %, 50° C., 10 min | Glossiness variation rate |
|---|---|---|---|---|
| Ex. 1 | 0.23 | 23.1 | 18.2 | 21% |
| Ex. 2 | 0.22 | 23.6 | 17.2 | 27% |
| Ex. 3 | 0.21 | 23.4 | 15.5 | 34% |
| Comp. Ex. 1 | 0.21 | 23.5 | 20.1 | 15% |
| Comp. Ex. 2 | 1.5 | 22.9 | 8.8 | 62% |

The contents of the specific embodiments described above are intended to illustrate the present invention in detail. However, these embodiments are only for illustration and are not intended to limit the present invention. It will be understood by those skilled in the art that various changes or modifications made to the present invention without departing from the scope defined by the appended claims will fall within the scope of the present invention.

What is claimed is:

1. A black matte polyimide film, comprising:
    polyimide, which is present in an amount of 75 to 93 wt % of the polyimide film, wherein the polyimide is obtained by polymerization of a dianhydride and a diamine to form a polyimide precursor, followed by chemical cyclization of the polyimide precursor, wherein the dianhydride is pyromellitic dianhydride, and the diamine comprises 5~7 mol % of p-phenylenediamine and 95~93 mol % of 4,4'-diaminodiphenyl ether;
    carbon black, which is present in an amount of 2 to 8 wt % of the polyimide film; and polyimide fine powder having a particle size between 2 and 10 µm and being present in an amount of 5 to 10 wt % of the polyimide film,
    wherein the polyimide film has a 60° glossiness between 5 and 30 and a thermal expansion coefficient of less than 41 ppm/° C.,
    wherein the black matte polyimide film has an optical transmittance variation of less than 0.1% and a glossiness variation of less than 21% after soaking in 10 wt % NaOH at 50° C. for 10 minutes.

2. The black matte polyimide film of claim 1, wherein the black matte polyimide film has a thickness between 5 and 100 µm.

3. The black matte polyimide film of claim 1, wherein the polyimide fine powder is formed by reaction of a diamine compound and a dianhydride compound with a monomer molar ratio of 1:0.950 to 1:0.995, and an effective particle size (S) of 2-10 µm of the polyimide fine powder is greater than 70%, wherein the effective particle size (S) is $S = B/(A+B+C) \times 100\%$
    A: percentage of polyimide fine powder with a particle size of less than 2 µm,
    B: percentage of polyimide fine powder with a particle size between 2 and 10 µm, and
    C: percentage of polyimide fine powder with a particle size of more than 10 µm.

* * * * *